United States Patent
Rincon et al.

(10) Patent No.: US 10,498,889 B2
(45) Date of Patent: Dec. 3, 2019

(54) ADVERTISEMENT FUNDED TELEPHONE CALLS

(75) Inventors: Lilian Rincon, San Mateo, CA (US); Alok Khanna, Mountain View, CA (US)

(73) Assignee: SKYPE, Dublin (IE)

(*) Notice: Subject to any disclaimer, the term of this patent is extended or adjusted under 35 U.S.C. 154(b) by 808 days.

(21) Appl. No.: 13/235,133

(22) Filed: Sep. 16, 2011

(65) Prior Publication Data
US 2013/0073395 A1    Mar. 21, 2013

(51) Int. Cl.
*G06Q 30/02* (2012.01)
*H04M 3/487* (2006.01)

(52) U.S. Cl.
CPC .................. *H04M 3/4878* (2013.01)

(58) Field of Classification Search
CPC .............................. H04M 15/00; G06Q 30/00
USPC .................. 705/14.67; 370/352; 379/114.13; 709/204
See application file for complete search history.

(56) References Cited

U.S. PATENT DOCUMENTS

| | | | |
|---|---|---|---|
| 6,788,771 B2* | 9/2004 | Manto | 379/114.05 |
| 8,259,915 B2* | 9/2012 | Berk | 379/114.13 |
| 2001/0034748 A1 | 10/2001 | Bimson et al. | |
| 2005/0097189 A1 | 5/2005 | Kashi | |
| 2007/0274510 A1 | 11/2007 | Jang | |
| 2008/0235332 A1* | 9/2008 | McChesney et al. | 709/204 |
| 2009/0030774 A1* | 1/2009 | Rothschild et al. | 705/10 |
| 2010/0107203 A1 | 4/2010 | Mc Carthy et al. | |
| 2010/0287301 A1 | 11/2010 | Kalmstrom et al. | |
| 2011/0069702 A1* | 3/2011 | Oktay et al. | 370/352 |

FOREIGN PATENT DOCUMENTS

| | | |
|---|---|---|
| CN | 101297316 | 10/2008 |
| CN | 101438549 | 5/2009 |
| CN | 101473636 | 7/2009 |
| GB | 2206265 A | 12/1988 |
| JP | 2003091255 A | 3/2003 |
| JP | 2004236255 A | 8/2004 |
| JP | 2009514351 A | 4/2009 |
| JP | 2010506498 A | 2/2010 |
| KR | 20090057995 A | 6/2009 |
| WO | WO-2005009019 | 1/2005 |
| WO | WO-2010127992 | 11/2010 |

OTHER PUBLICATIONS

"International Search Report", dated Mar. 6, 2013, Application No. PCT/US2012/055682, Filed date: Sep. 16, 2012, pp. 15.

(Continued)

*Primary Examiner* — Marilyn G Macasiano
(74) *Attorney, Agent, or Firm* — Schwegman Lundberg & Woessner, P.A.

(57) ABSTRACT

A method for rendering a document is disclosed. The method includes identifying a phone number in the document. The sponsorship configuration of the phone number is then determined. A caller account configuration is also determined. The caller account configuration is associated with a user of a device and the device is configured to display the document. The document is amended to format the phone number according to the sponsorship configuration and the caller account configuration.

20 Claims, 7 Drawing Sheets

(56) References Cited

OTHER PUBLICATIONS

"Office Action Issued in Japanese Patent Application No. JP2014-530919", dated Sep. 20, 2016, 10 Pages.
"Foreign Office Action", CN Application No. 201210339886.3, dated Mar. 31, 2016, 11 pages.
"Foreign Office Action", CN Application No. 201210339886.3, dated Apr. 21, 2015, 15 pages.
"Foreign Office Action", CN Application No. 201210339886.3, dated Dec. 8, 2015, 18 pages.
"Foreign Notice of Allowance", CN Application No. 201210339886.3, dated Mar. 1, 2017, 4 pages.
"Foreign Office Action", CN Application No. 201210339886.3, dated Dec. 15, 2016, 6 pages.
"Office Action Issued in Korean Patent Application No. 10-2014-7006873", dated Aug. 8, 2018, 11 Pages.
"Office Action Issued in European Patent Application No. 12768970.1", dated May 24, 2018, 4 Pages.
"Foreign Office Action", JP Application No. 2014-530919, dated May 23, 2017, 10 pages.
"Office Action Issued in Japanese Patent Application No. 2014-530919", dated Feb. 13, 2018, 5 Pages.
"Foreign Office Action", CN Application No. 201210339886.3, dated Dec. 16, 2013, 10 pages.
"Foreign Office Action", CN Application No. 201210339886.3, dated Nov. 2, 2014, 11 pages.
"Office Action Issued in Korean Patent Application No. 10-2014-7006873", dated Jan. 30, 2019, 5 Pages.

\* cited by examiner

ADVERTISEMENT FUNDED TELEPHONE CALLS

BACKGROUND OF THE INVENTION

Field of the Invention

Embodiments of the present invention relate generally to communicating over a packet-based network and more particularly advertisement-funded telephone calls.

Description of the Related Art

Some communication systems allow the user of a device, such as a personal computer, to communicate across a packet-based computer network such as the Internet. Such communication systems include voice over internet protocol ("VoIP") communication systems. These systems are beneficial to the user as they are often of significantly lower cost than conventional fixed line or mobile networks. This may particularly be the case for long-distance communication. To use a VoIP system, the user installs and executes client software on her/his device. The client software provides the VoIP connections as well as other functions such as registration and authentication. In addition to voice communication, the client may also provide further features such as video calling, instant messaging ("IM"), SMS messaging, file transfer and voicemail.

One type of communication system for packet-based communication uses a peer-to-peer ("P2P") topology. To enable access to a peer-to-peer system, a user must execute P2P client software provided by a P2P software provider on their computer, and register with the P2P system. When the user registers with the P2P system, the client software is provided with a digital certificate from a server. Once the client software has been provided with the certificate, then calls or other communications can subsequently be set up and routed between users of the P2P system without the further use of a server in the set-up. Instead, the client looks up the required IP addresses from information distributed amongst the P2P client software on other end users' computers within the P2P system. Once the IP address of a callee's terminal has thus been determined, the caller's P2P client software then exchanges certificates with the callee's P2P client software. The exchange of the digital certificates (or user identity certificates, "UIC") between users provides proof of the users' identities and that they are suitably authorized and authenticated in the P2P system. Therefore, the presentation of digital certificates provides trust in the identity of the users. It is therefore a characteristic of peer-to-peer communication that, once registered, the users can set up their own communication routes through the P2P system in a decentralized manner based on distributed address look-up and the exchange of one or more digital certificates, without using a server for those purposes. Further details on such a P2P system are disclosed in WO 2005/008524 and WO 2005/009019. VoIP or other packet-based communications can also be implemented using nonP2P systems that do use centralized call set-up.

Typically, service providers that provide VoIP service charge a fee to enable a caller to call a phone number. What is needed are systems and methods to enable third party sponsorships of the services provided by service providers to effectuate free or reduced fee services to the users of these services.

SUMMARY OF THE INVENTION

In one embodiment, a method for rendering a document is disclosed. The method includes identifying a phone number in the document. The sponsorship configuration of the phone number is then determined. A caller account configuration is also determined. The caller account configuration is associated with a user of a device and the device is configured to display the document. The document is amended to format the phone number according to the sponsorship configuration and the caller account configuration.

In another embodiment, an Internet based communication system is disclosed. The Internet based communication system includes a plurality of end user terminals configured to be connected to the Internet, a gateway coupled to the Internet and a PSTN or mobile network for routing phone calls initiated from one of the plurality of end user terminals to a phone number in the PSTN or mobile network, and a page formatter for formatting a document to be displayed on the one of the plurality of end user terminals.

In yet another embodiment, a computer readable storage medium containing a program which, when executed, performs an operation of rendering a document, is disclosed. The operation includes identifying a phone number in the document, determining sponsorship configuration of the phone number and determining a caller account configuration. Wherein the caller account configuration is associated with a user of a device and the device is configured to display the document. The operation also includes amending the document to format the phone number according to the sponsorship configuration and the caller account configuration.

Other embodiments include, without limitation, a non-transitory computer-readable storage medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
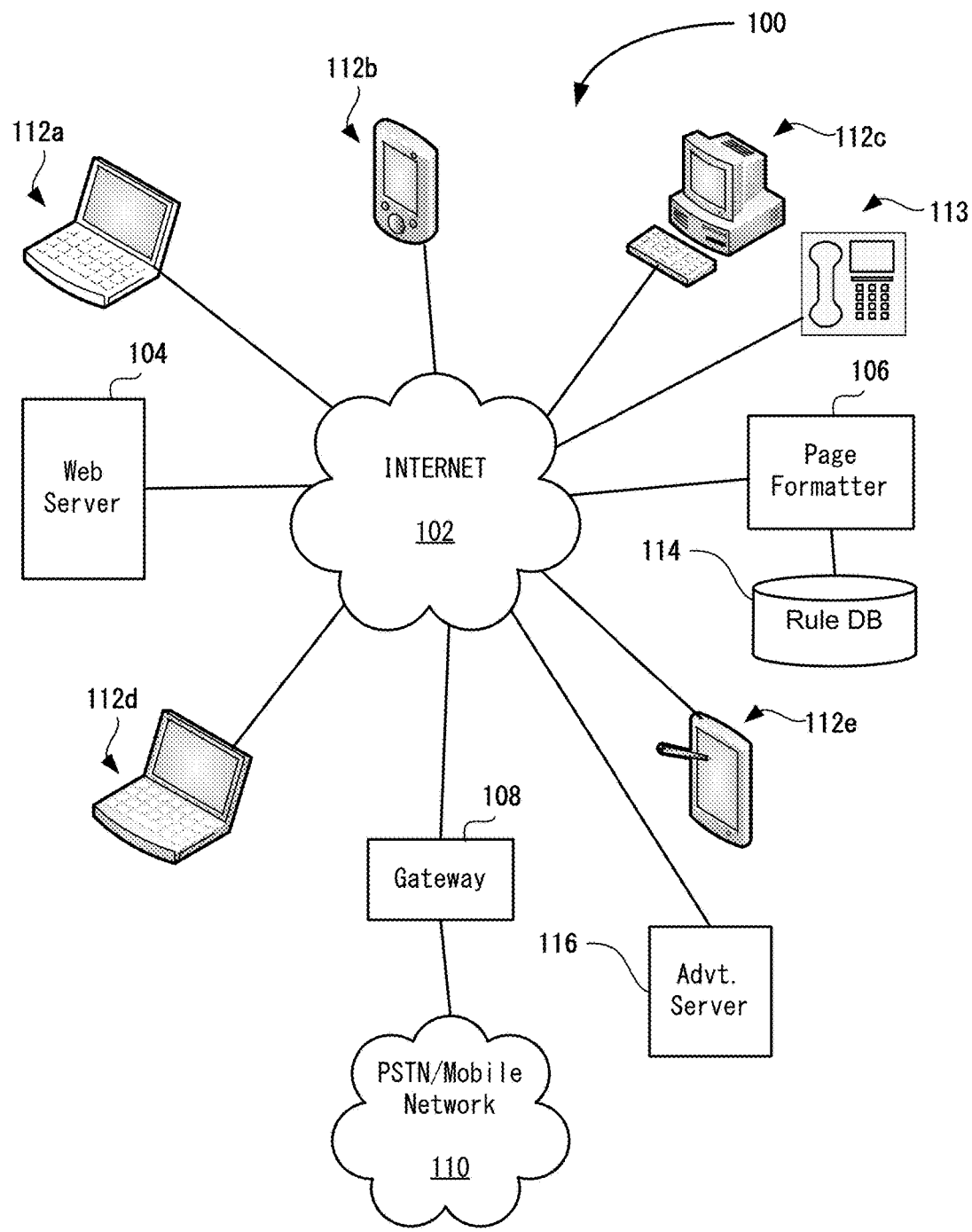
FIG. 1 illustrates a schematic depiction of a communication system based on the Internet, according to one embodiment of the present invention.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Reference throughout this disclosure to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In preferred embodiments, the present invention retrieves instructions for displaying one or more telephone numbers on a webpage in response to detecting the telephone number(s) on the webpage, or other document displayed on a screen. It should be noted that the term "webpage" is being used for the sake of simplicity. A person skilled in art, however, would appreciate that the systems and methods described herein would equally apply to other types of documents that include textual data. Some examples of these documents are XML files, Document Files, Spreadsheets, Presentation files, etc. Recognition of phone numbers in a document is described in US Patent Application Number 2002/0274510, which is incorporated herein by reference. Accordingly, a web page or other document is re-rendered such that numbers or alphanumeric sequences with a particular format are displayed as click to call icons which allow the user to initiate a VoIP call by clicking the icon. In addition to such phone number recognition, according to preferred embodiments of the present invention then information associated with the detected number (and optionally information relating to the webpage or user) is retrieved and used to re-render the page. The information may be retrieved by formulating a query containing the detected phone number at the user equipment, then sending the query to a server which processes the query and responds with instructions for re-rendering a portion of the page. The instructions may indicate how the number should be displayed, or specify that a clickable call icon or such like should be inserted in association with the number.

In this manner certain numbers can be handled differently, in accordance with different criteria. For example, numbers that are more relevant to a user, or paid for by a third party, may be displayed more prominently on the web page such that a call may be established more easily.

Pricing information may be retrieved and displayed next to the number such that a user is aware of the cost of the call before the call is established. In another embodiment, if a call to the displayed number is sponsored by an advertiser, the display may be changed accordingly to indicate to the user that calls to the displayed number are free. However, in such cases, a short Audio, Video, A/V or rich media advertisement may be played before the call is connected or both. In one embodiment, a video advertisement may continue to play on the display during the lifetime of the call. Thus P2P or other VoIP or packet-based communications are advantageously made more readily accessible to the user, by integration of related information and/or controls into a more familiar or regularly-used working environment for the user.

As mentioned, the modified page may provide a control such as a clickable call icon which allows the user to establish communications with the relevant party. However, alternatively or additionally, there are a range of other possible uses for a phone number once it has been recognized and sent to a server for processing. One example is to perform a location lookup and offer location-specific services in conjunction with the city code that the number belongs to. Another is to perform a reverse directory lookup to find additional information about the number, such as the name associated with the phone number, etc., and then provide directory services in conjunction with that company or person's name.

FIG. 1 is a schematic illustration of a communication system 100. The communication system 100 includes at least a packet-based network such as the Internet 102, which comprises one or more of a plurality of interconnected elements such as a laptop computer 112a, 112d, a mobile phone 112b, a desktop computer 112c, a tablet computer 112e and a Web server 104. The communication system 100 also includes an advertisement server 116 and a page formatter 106. A rule database (DB) 114 may be coupled to the page formatter 106 either directly or through the Internet 102. A telephony gateway 108 may also be included to route telephone calls to PSTN or mobile network 110. At least some of network elements are inter-coupled with the rest of the Internet 102, and is configured to communicate data with other such elements over the Internet by transmitting and receiving data in the form of Internet Protocol (IP) packets. Each element that is coupled to the Internet 102 also has an associated IP address locating it within the Internet. A person skilled in the art would appreciate that other than the elements shown explicitly in FIG. 1, many other elements may be coupled to the Internet 102. For example, a P2P server may be included in the communication system 100. Other end-user terminals (e.g., laptop computers, desktop computers, smart phones, tablet computers, etc.), servers and gateways, as well as routers of Internet service providers (ISPs) and Internet backbone routers, etc. may also be included in the communication system 100.

In one embodiment, each of a plurality of the end-user terminals includes communication software comprising a P2P client application, which may also include features for calling phone numbers from the end-user terminal. When executed, the P2P client application allows the end user terminals (e.g., 112a . . . e) to establish bidirectional communication channels with other such end-user terminals or PSTN phones via the Internet using P2P call set-up (or more generally connection set-up). In one embodiment, the P2P client applications also share presence information with one another, which provides an availability status of users. The presence information for each user is preferably at least in part defined by the users themselves. To supplement the decentralized call set-up, the P2P client application may retrieve some additional information from a P2P server (not shown), such as contact lists which provide the names of the users' contacts, "avatars" which are images chosen by users to represent themselves within the P2P server.

One or more of the end-user terminals 112a-e is also installed with document-browser client software, such as a web browser. When executed, the document browser client software allows the end-user terminals 112a-e to retrieve electronic documents in the form of webpages (or other forms of electronic documents, such as a document file, XML file, PDF file, XLS file, etc.) from the Web server 104 and display them on their screens under control of the user. It should be noted that an end user terminal 112a-e could be any computing device that is capable of displaying Web pages/documents and connect to the Internet 102. A Voice Over IP (VoIP) landline phone 113 may also be coupled to the Internet 102. The VoIP phone is configured to communicate with the P2P server 106.

A P2P client application may also be installed at a gateway 108 coupled to both the Internet 102 and a PSTN network and/or a mobile cellular network 110. This allows the P2P client applications running on the end-user terminals 112*a-e* to communicate with ordinary land-line telephones and/or mobile telephones respectively, even if those telephones themselves do not run P2P client applications and are not directly coupled to the Internet 102. In that case, the P2P client application on the end user terminals 112*a-e* sets up a connection over the Internet with the P2P client application on the gateway 108 using P2P call set-up and provides it with a phone number, and the gateway 108 uses the phone number to set up a connection with the telephone over the PSTN or/and mobile network 110.

In one embodiment, if a particular end-user terminal 112*a* does not have an associated phone number, either the gateway 108 or the P2P server may assign a temporary outgoing identity (aka a caller identification number) prior to setting up a call to a phone number in either the PSTN or mobile network 110. In one embodiment, the temporary phone number may be a random number or preconfigured by the user or by the P2P server.

The page formatter 106, in one embodiment, is used by the end user terminals 112*a-e* to format a document during, prior to or after the document is displayed on the end user terminal display. In one embodiment, the page formatter 106 parses the document (or one or more sections thereof) to find phone numbers in the document and to format the found phone numbers in different ways accordingly to configurations and rules. The phone numbers may also be amended to include or remove some parts to make the phone numbers readily dialable based on the location of the end-user terminal 112*a*. For example, a country code may be added if it is determined that one of the found numbers in the document is a foreign phone number and the end user terminal 112*a* is currently located in a different country. In one embodiment, the rule DB 114 includes rules and configurations to help the page formatter 106 to format the numbers. In an alternative embodiment, an application may be executed in the end user terminal 112*a* itself to perform some or all functions of the page formatter 106. For example, a browser pluggin may be used to format the document.

Figure 2:
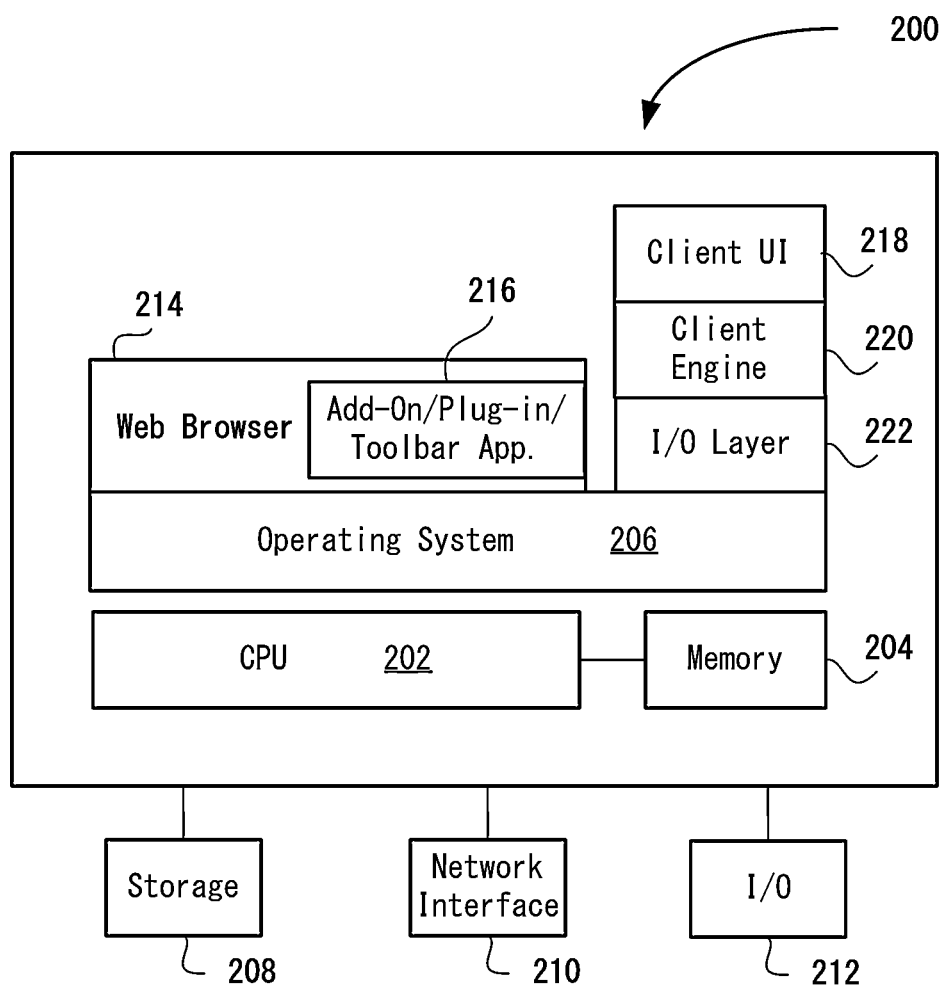
FIG. 2 is a logical diagram of an end user terminal, according to one embodiment of the present invention.

The schematic block diagram 200 of FIG. 2 shows an end-user terminal 112*a*, which is configured to act as a terminal of a P2P system operating over the Internet 102. The end user terminal 112*a* comprises a CPU 202 operatively coupled to a network interface 210, such as modem for connecting to the Internet 102, a non-volatile storage device 208, such as a hard-drive or flash memory, and a volatile memory device such as a random access memory (RAM) 204. The end-user terminal 112*a* also comprises one or more user input devices, for example in the form of a keyboard, mouse, microphone and webcam, each operatively coupled to the CPU 202 via an I/O interface 212. The end-user terminal 112*a* further comprises one or more user output devices, for example in the form of a display screen and speaker, again each operatively coupled to the CPU 202. The storage device 208 stores software including at least an operating system (OS) 206, a document-browser client application in the form of a web browser 214, and packet-based communication software comprising a P2P client application that includes a Client UI 218, a Client Engine 220 and an I/O Layer 222. On start-up or reset of the end-user terminal 112*a*, the operating system software 206 is automatically loaded into the RAM 204 and from there is run by being executed on the CPU 202. Once running, the operating system 206 can then run applications such as the web browser 214 (and browser plug-in/toolbar 216) and P2P client application by loading them into the into the RAM 204 and executing them on the CPU 202.

In one embodiment, the P2P client application comprises three basic layers: an input and output 222, a client engine layer 220, and a user interface (UI) layer 218. The web browser application 214, P2P client application and P2P toolbar/add-on/plug-in application 216 are run in the operating system 206. This means that in a multi-tasking environment they are scheduled for execution by the operating system 206; and further that inputs to the web browser application 214 and the I/O layer 222 of the P2P client application from the input devices as well as outputs from the web browser application 214 and the I/O layer 222 of the P2P client application to the output devices may be mediated via suitable drivers and/or APIs of the operating system 206.

In one embodiment, the I/O layer 222 of the P2P client application comprises audio and/or video codecs which receive incoming encoded streams and decodes them for output to the speaker (not shown) and/or display (not shown) as appropriate, and which receive un-encoded audio and/or video data from the microphone (not shown) and/or webcam (not shown) and encodes them for transmission as streams to other end-user terminals 112*a-e* of the communication system 100 (or the P2P system). The I/O layer 222 may also comprises a control signaling protocol for signaling control information between end-user terminals 112*a-e* of the Internet 102. The client engine 220 then handles the connection management functions of the communication system 100 as discussed above, such as establishing calls or other connections by P2P address look-up and authentication. The client engine 220 may also be responsible for other secondary functions of the communication system such as supplying up-to-date contact lists and/or avatar images of the user to the P2P server within the communication system 100 or retrieving up-to-date contact lists of the user and retrieving up-to-date avatar images of other users from the P2P server. Further, the client engine 220 retrieves presence information from the other clients of the users in the contact list via a public API, and reciprocally provide its own presence information to those other clients that are online, Exchange of presence information directly between clients via a public API is the preferred option, but alternatively the presence information could be exchanged via an intermediate node such as the P2P server.

The UI layer 218 is responsible for presenting decoded video to the user via the display, for how to arrange the presented output on the display along with user controls such as buttons and menus, and for receiving inputs from the user via the presented controls. The I/O layer 222 of the P2P client application is arranged to be able to interact with the P2P toolbar/add-on/plug-in 216 and the P2P toolbar/add-on/plug-in 216 is arranged to be able to interact with the web browser application 214, preferably all under control of the OS 206.

Figure 3:
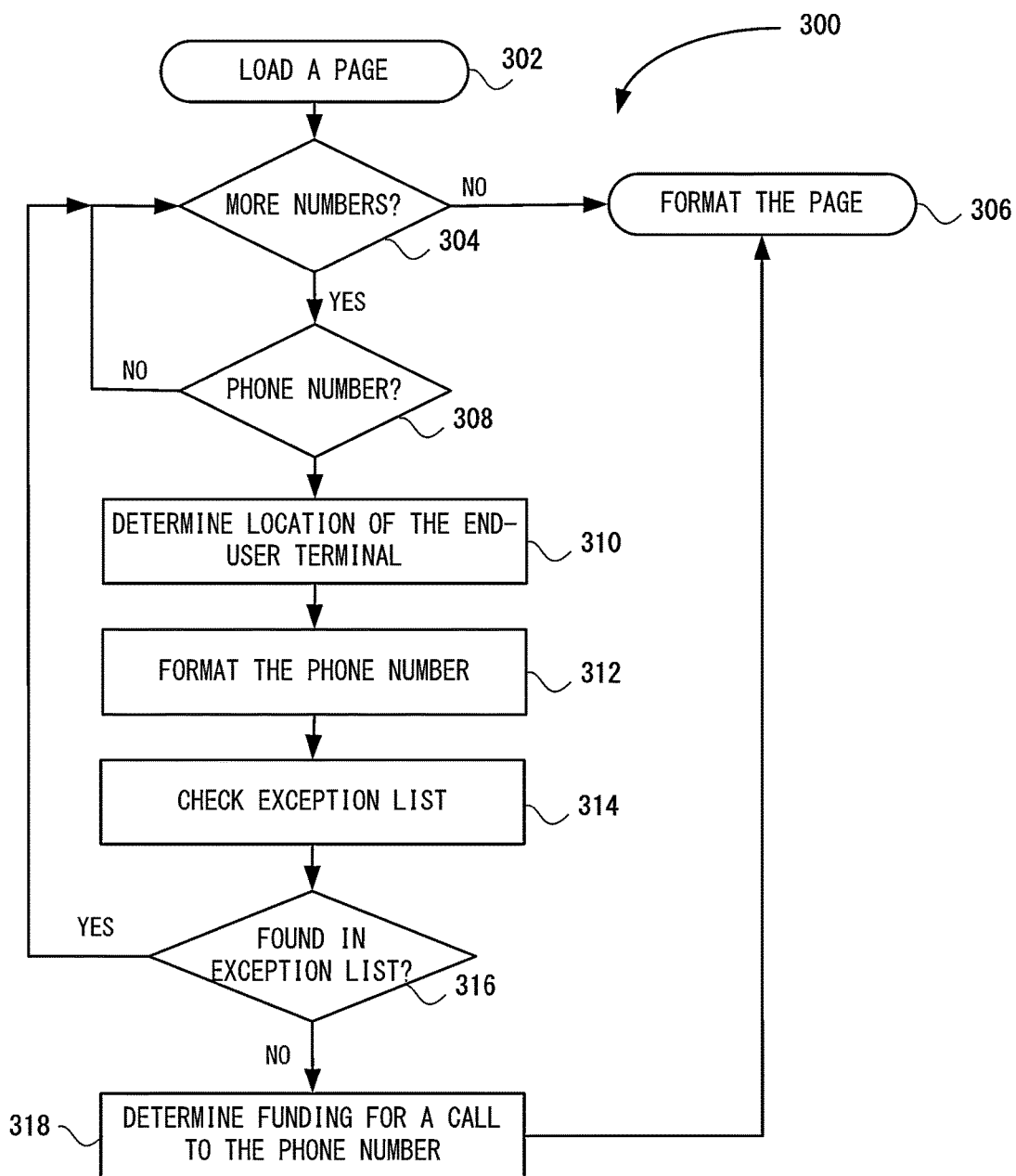
FIG. 3 illustrates an exemplary process of formatting phone numbers in a document, according to one embodiment of the present invention.

FIG. 3 illustrates a flow diagram 300 for formatting a document, such as an HTML page, XML page, a word processing document, etc. or a combination thereof. Accordingly, at step 302, the page is loaded from a source such as a server in the Internet 100. The document is loaded by the end-user terminal 112*a* for displaying the document to a user of the end-user terminal 112*a*. At decision step 304, a determination is made if there are more numbers to be processed, in the loaded document. If yes, at decision step 308, a determination is made if a number found in the document is a phone number. Recognition of phone numbers in documents is described in US2002/0274510, which is being incorporated herein by reference. In addition, in one embodiment, a contextual logic is used to determine if a selected number in the document is a phone number. For example, if the number appears in a sentence or a block of text that is directed to phone calls or establishing contacts. For example, the number in the sentence "For further information call 202-5551212" is likely to be a phone number because of the context of the sentence. That is, for example, if words such as "call," "contact," etc. appears in the proximity of a number, the number is likely to be a phone number. In another example, based on the contextual information, it can be determined that the first number in the sentence "Total 3745909 students attended California schools in the year 2008" is not a phone number and the second number is also not a phone number because it is too short and the contextual information does not suggest the second number being a phone number. In another embodiment, document tags (e.g., XML tags, HTML tags) may be used either independently or in conjunction with the contextual information of the document to identify phone numbers in a document.

At decision step 308, if the number is not a phone number, the control goes back to decision step 304. If the number is a phone number, at step 310 the location of the end-user terminal 112a is determined. The location may be used for formatting the phone number based on some contextual logic. For example, if a document contains the phone number 202-5551212, a determination can be made, based on the information provided in the document itself or in the related documents, about the location of the organization or the person. In additional to the use of contextual information found in the document or in the related document (e.g., most Internet sites includes a "Contact Us" page). A database of area codes in the world or at least in some countries, may also be maintained to help identify the destination country of a phone number.

At step 312, the phone number is formatted to include all necessary information for calling the number. For example, if the location of the end-user terminal that loaded the document was in a country other than the USA, the number "202-5551212" may be formatted to "0012025551212." However, if the location of the end-user terminal is found to be in the US, the number may be left unchanged or may be changed to "12025551212." In one embodiment, a mapping of toll free numbers and their corresponding toll numbers may be maintained in a database or data store and the toll free number may be replaced by the corresponding toll number, if the end-user station is found be to located in a foreign country.

An exception list may also be maintained to determine if the phone number should be allowed to be called. Or at least, should the number be allowed to be called free of cost, using the sponsorship. For example, some or all 900 series numbers may be placed in the exception list. In another embodiment, a sponsor of free phone calls may be able to configure the exception list to disallow sponsored calls to those numbers.

At decision step 316, if the phone number is found in the exception list, the control goes back to step 304. Else, at step 318, sponsorship of a call to the phone number is determined. The sponsorship determination may be based on several factors such as availability of a sponsor for funding a call to the phone number, availability of calling credits in the caller's account, etc. For example, if the caller has sufficient available credits for making phone calls, the caller may elect to use the calling credits instead of seeing or hearing advertisements in lieu of making a free or reduced rate phone call. Then, at step 306, the document is formatted to add visual and/or other distinguishing features to the display of the phone number. In one embodiment, the process of formatting the document takes place after processing all numbers in the document. In other embodiments, especially where technologies such as HTML5, AJAX, etc. are in use, individual sections of the documents may be formatted and updated on the display without waiting for the whole document to be processed for the phone numbers.

A person skilled in the art would realize that some steps in the flow diagram 300 may be omitted. For example, in some embodiments, step 310 and/or 314 may be omitted. In one embodiment, the steps of the flow diagram 300 are performed in the sequence as depicted in FIG. 3. However, in other embodiments, the steps may be performed in a different sequence. For example, step 314 may be performed before step 312.

Figure 4:
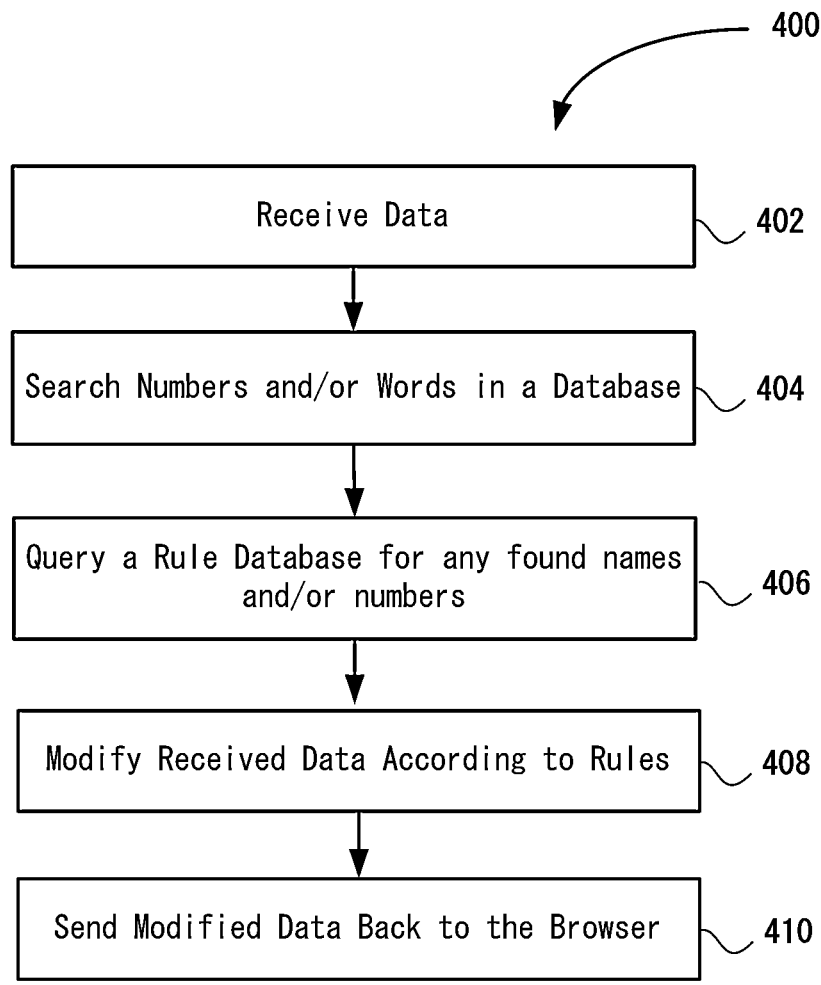
FIG. 4 illustrates a flow diagram of a process performed by a page formatter, according to one embodiment of the present invention.

FIG. 4 illustrates a flow diagram 400 for applying rules by the page formatter 106 (FIG. 1). However, a person skilled in the art would appreciate that at least some of the steps may be performed at the end-user terminal 112a-e without departing from the essence of the invention. Accordingly, at step 402, the page formatter receives the data from the end-user terminal 112a. The received data includes numbers or/and words. At step 404, the page formatter searches, in a database, numbers/words to determine if the input number or word corresponds some configurations, logos, information, etc. based on sponsorship configurations. At step 406, the rule DB 114 is queried to retrieve any rules associated with the input number or word. This process may be invoked during steps 318 or 306 of FIG. 3. In other embodiments, this process may also be invoked to find corresponding toll numbers for toll free numbers, etc. At step 408, the received data is modified according to the rules, if found and at step 410, the modified data is sent back to the caller (e.g., the browser application 214).

Figure 5:
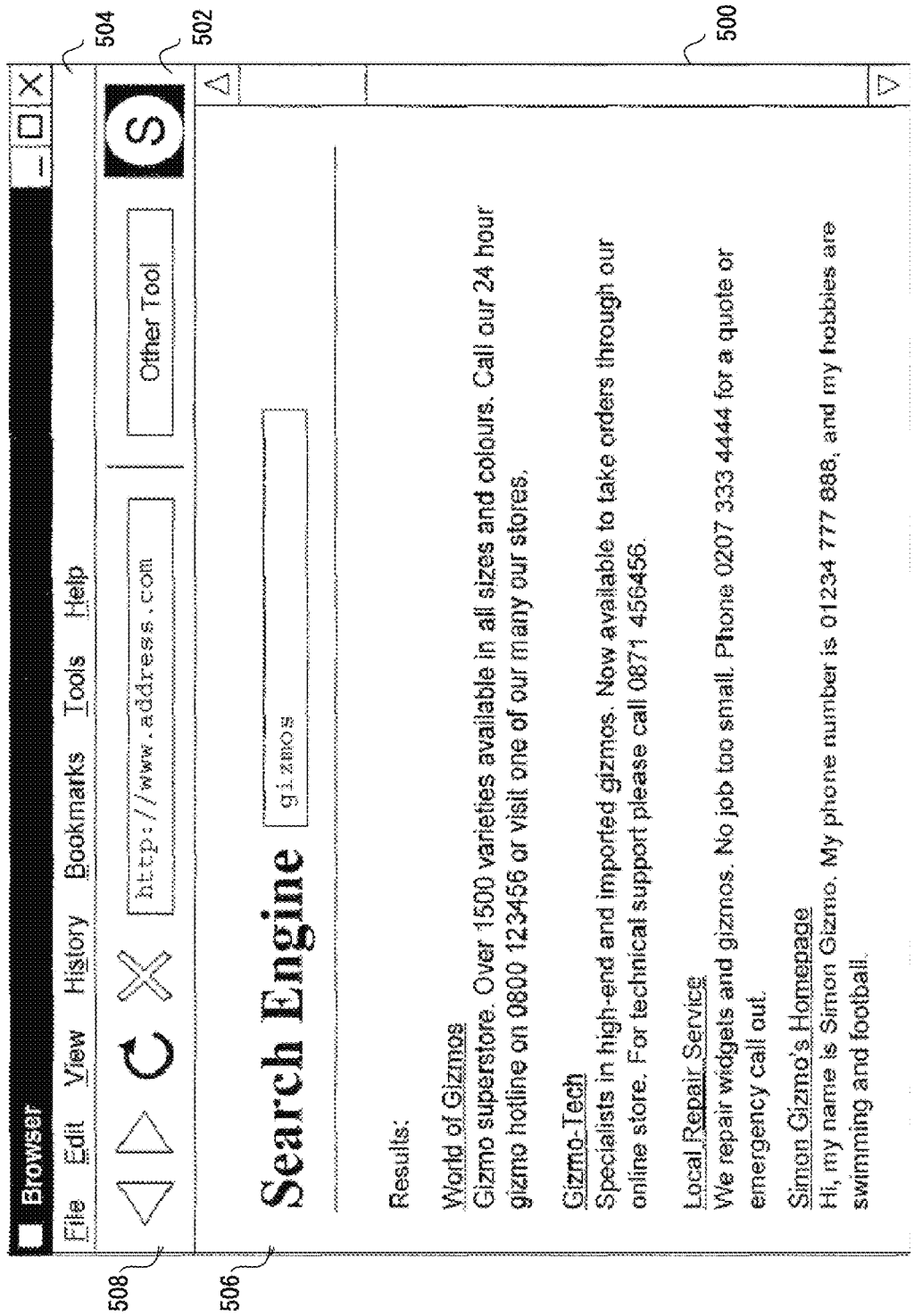
FIGS. 5 and 6 illustrate a Web document including phone numbers, according to one embodiment of the present invention.

FIG. 5 illustrates schematically an example user interface 500 of the web browser application 214 as would be seen when open for viewing on a display. This user interface comprises menus for accessing 504 various functions of the browser application 214. The user interface 500 also comprises navigation controls 508 allowing the user to access and navigate between different webpages, such as back, forward, refresh and stop controls and/or an address bar for entering web addresses. Thus the user is able to select which website to retrieve and display from one or more Web servers. The user interface 500 also comprises a display of the actual selected webpage itself 506. The website comprises various numerical or alphanumerical characters, either in a text format or potentially in graphical form.

The user interface 500 may further comprise one or more toolbars 502 showing an indication of one or more toolbar applications running in conjunction with the browser application 214. The toolbars may also include controls allowing the user to access the toolbar applications or functions of them, which the user can thus select or control via the web client's user interface. In one embodiment, the browser application 214 may include a toolbar which can run in conjunction with the web browser application 214, indicated by the "S", which indicates to the user at least that the toolbar application is running, and may allow access to the P2P client application of functions thereof when clicked. Further, the add-on/plug-in/toolbar 216 is able to communicate data to and from both of the web browser 214 and the P2P client application. Even when the user interface 218 of the P2P client application is not open for viewing on the display, the add-on/plug-in/toolbar 216 may still be running and interacting with the web browser application 214, and may allow the P2P client application to be launched via the user interface of the web browser 214.

The add-on/plug-in/toolbar 216 interacts with the web browser 214 in order to read information from the webpage currently selected by the user for viewing. The add-on/plug-in/toolbar 216 then scans the webpage for numbers having a format that matches one or more of certain predetermined formats. An example for implementing this is described in US2002/0274510. For example, the add-on/plug-in/toolbar 216 may recognize that a number beginning "0800" or "0871" and continuing with six further digits is a phone number, and that a number starting "01" or "02" and continuing with nine further digits is a phone number. Such formats could be stored locally at the end-user terminal 112a or the blocks of data may be sent to the page formatter 106 for the identification of phone numbers and formatting of the webpage. As discussed above, page subject matter context information may also be used, either independently or in conjunction with the above method to identify phone numbers in a webpage. However, the add-on/plug-in/toolbar 216 does not mistake numbers like "15000" or "24" as phone numbers.

Figure 6:
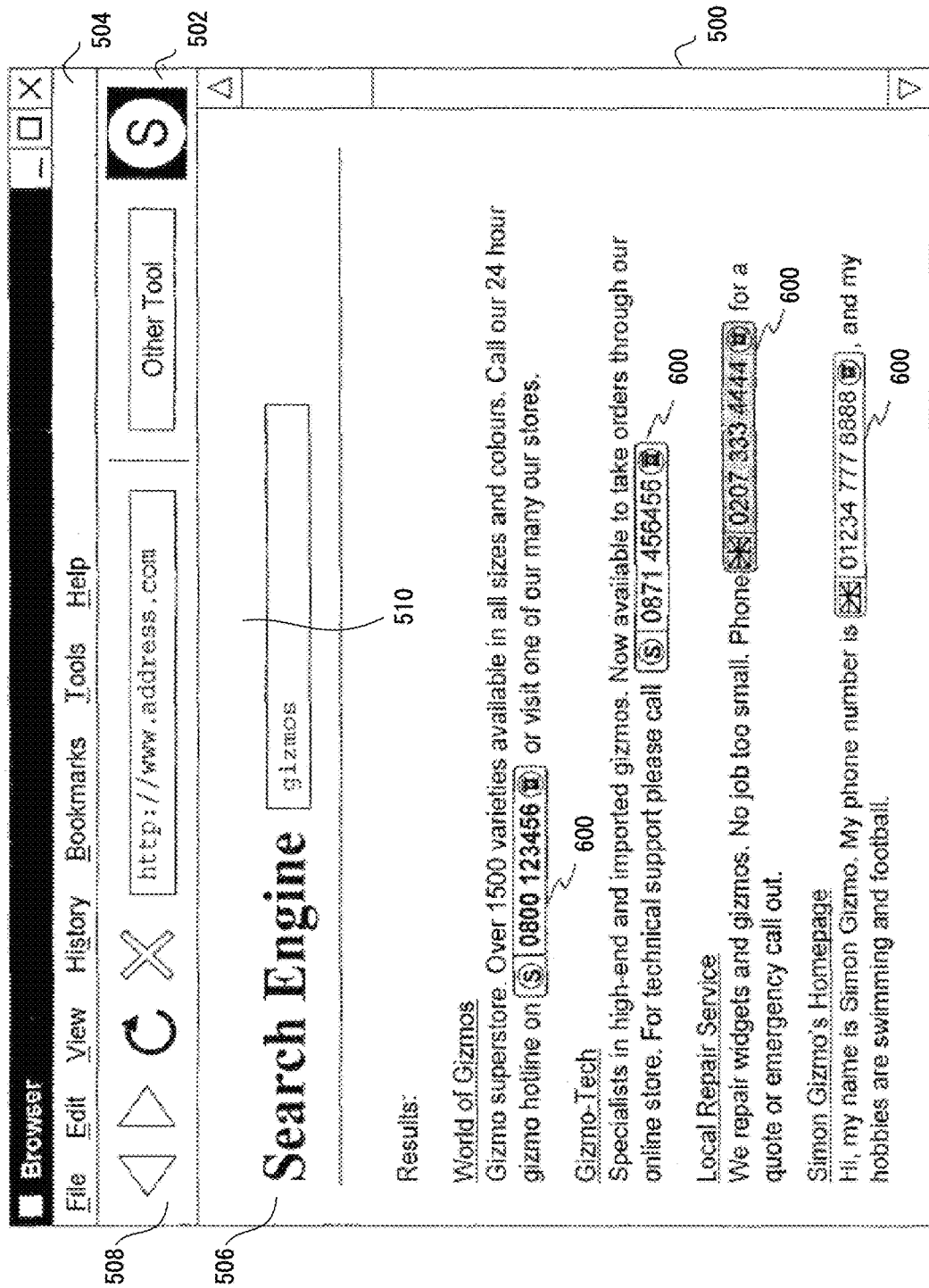

Once recognized, the add-on/plug-in/toolbar 216 (or alternatively, the page formatter 106) flags-up the phone numbers by modifying the manner in which a portion 510 of the webpage is displayed so as to change the way the phone numbers are displayed and/or to insert information in conjunction with the webpage. For example in FIG. 6 a box is placed around the phone numbers and a control in the form of clickable icon is inserted. If the user clicks the icon, the P2P application is launched and the phone number is dialed. The P2P client application uses the phone number to establish a call with the relevant telephone via the packet-based network 102, gateway 108 and PSTN or mobile cellular network 110.

According to preferred embodiments of the present invention, not only does the add-on/plug-in/toolbar 216 highlight or flag-up the phone number, but also selects the manner in which it is flagged-up from a plurality of possibilities depending on some rule or criterion. Preferably, the rules are implemented at a remote database, e.g. the rule DB 114. In that case, in response to detecting one or more phone numbers in the displayed page, the add-on/plug-in/toolbar 216 may formulate a query message containing a list of one or more of the recognized numbers, and transmit this query to the database over the Internet 102. The page formatter 106 then evaluates the information in the query based on the rules and formulates a response containing instructions as to which a plurality of potential available display configurations should be used to modify the manner in which the page is displayed for each recognized number. The modified information is re-rendered the webpage.

Alternatively though a set of rules could be retrieved speculatively in advance before detecting phone numbers, or implemented more permanently at the end-user terminal 112a, although the advantage of storing the rules at a centrally queryable database is that they are more readily updated. Further, the modifying of the webpage does not have to be by rendering and re-rendering, but could alternatively be achieved by modifying the underlying data before actually rendering the document for display on the screen. The rule(s) preferably at least include a rule by which the selected display configuration depends on the format of the detected phone number. For example, the rule could be that any number whose format corresponds to a free number is displayed in a certain manner, whilst pay numbers are displayed in another. E.g. in FIG. 6, it has been determined that numbers beginning "0800" are non-geographic free phone numbers and displays them in bold text surrounded by a certain style of box 600, whilst numbers beginning "0871" are nongeographic numbers incurring payment and are displayed in a similar style box 600 but without bold text. Further, the numbers beginning "01" or "02" are geographic numbers and surrounds them with a different style of box than non-geographic numbers.

As a further example, the manner in which the webpage is displayed could be modified such that when a user performs a certain user interaction in relation to the modified portion of the display, then the display changes in a certain way. For example, when the user moves the mouse cursor over the inserted call icon for the free-phone "0800" number then the number is overwritten with a message such as "Free Call".

Other examples of instructions for re-rendering webpages could include: an instruction to change the size of number(s) on the webpage; an instruction to display associated information with each number such as company or pricing information, and an instruction to indicate that number is telephone number and provide clickable call icon. In another example, the database could look up the number(s) against a web directory and the rule(s) could be so as to provide instructions for display depending on who the number corresponds to. Further, other information may be sent in the query than just the number or detected format. Optionally, information on the user, the webpage and/or the end-user terminal 112a could be taken into account. For example, the rules could include rules by which the selected display configuration depends on the relevance of the format to the user. For example, if the user lives in London, it could be determined that numbers beginning with "0207" are more relevant than other geographic phone numbers, and hence could be displayed differently. For example, the "0207" number is highlighted in a particular manner whilst the "01234" number is not. In another example, the context of the particular webpage could be taken into account, e.g. numbers on a bank webpage could be ignored in case an account number has the same format as a phone number.

Figure 7A:
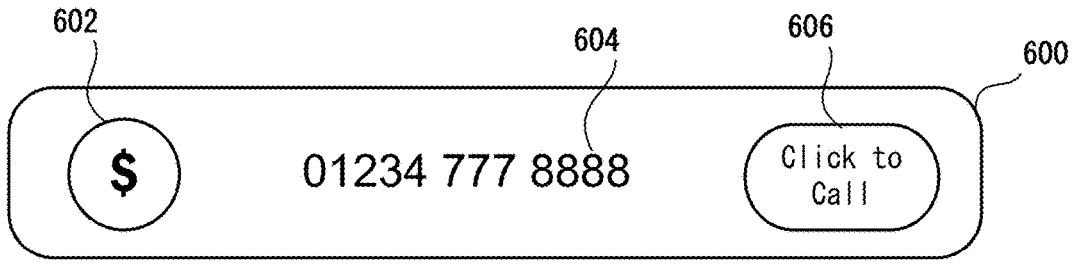
FIGS. 7A-7E illustrate exemplary depictions of a phone number display block in a document, according to one embodiment of the present invention.
Figure 7B:
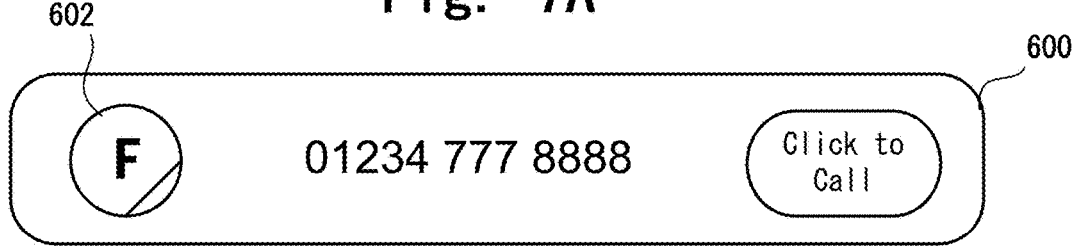

FIGS. 7A-7E illustrate various exemplary designs of the phone box 600. As illustrated in FIG. 7A, the phone box 600 may include an icon 602 to visually indicate the type of phone number 604. The phone box 600 may also include a button or link or click area 606 to initiate a call.

As described above, based on the rules and sponsorships, a call to a selected number may be free, even if the phone number 604 is not a toll free number. To indicate that a call to the displayed number 604 is free, a distinguishable icon 602 may be displayed. In one embodiment, an advertising server code is inserted in the link that is associated with the formatted phone number display. When a user clicks or selects the phone box 600 to initiate a sponsored call, based on the inserted code, a selected advertisement is retrieved from the advertisement server 116. The retrieve advertisement may be audio recording, video recording, A/V recording, text only information, etc. The retrieved advertisement may be played to the user for a selected durations, typically in seconds and then the call may be connected to the called party via the Internet 102, the gateway 108 and the PSTN/Mobile Network 110. In one embodiment, an audio-less display of the retrieve advertisement or a different advertisement may continue in the client UI 218 at least for a subset of the lifetime of the sponsored call.

In one embodiment, if the user is willing to pay for the call (which is otherwise a sponsored call), the process of retrieving an advertisement and playing to the user may be omitted. In such cases, the user's account is charged according to the destinations and duration of the call. The user may configure the P2P client application to disable sponsored calls and charge the user's account for non-toll free calls. Alternatively, before every call, the P2P client application may be configured to let the user decide whether the user would like to use the sponsored call feature or would like to be charge for the call. Further, the advertising server may be configured to enable sponsors to control the sponsored calls. For example, a sponsor may decide not to sponsor calls to foreign countries or may decide to sponsor calls originated from selected regions, etc.

Figure 7C:
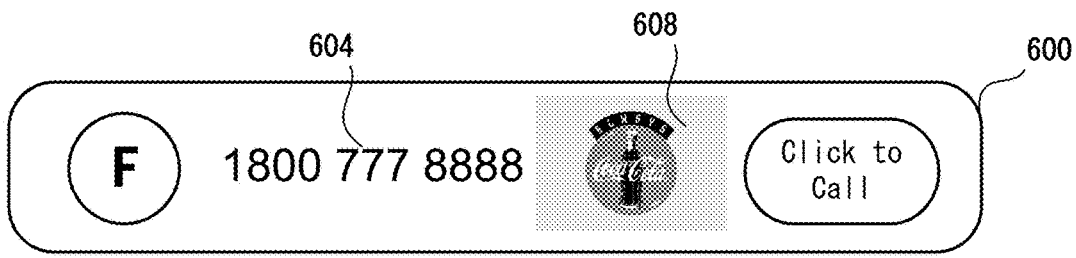

In another embodiment, as depicted in FIG. 7C, if desired by a sponsor, through a preset configuration for the displayed phone number 604, a logo 608 or any image or information may be displayed next to the phone number 604. For example, the fictitious phone number 604 is associated with Coca Cola™ and Coca Cola Co. may wish to have their logo displayed whenever a particularly identified phone number is displayed by the browser application 214. In another embodiment, the sponsor may configure the system to change the original phone number in the document to another selected number. A replacement number may be selected from a database based on the location of the end user terminal 112*a* and/or, time, month, etc. In yet another embodiment, the original number remains on the display in the phone box 600. However, a different selected number is dialed when the phone box 600 is clicked (or a marked area 606 in the phone box 600).

Figure 7D:
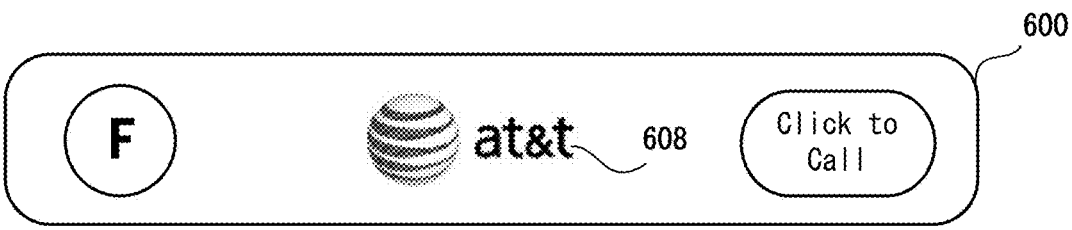

In yet another embodiment as depicted in FIG. 7D, some sponsors may configure (or provide configurations) the communication system 100 to display a particular logo 608 or other information every time one or more pre-selected numbers are displayed by the browser application 214. Logos and other information may be stored in a database along with configuration information to enable the page formatter 106 and/or the add-on/plug-in/toolbar 216 to format the page accordingly to the configurations for specific sponsors. The phone number to be called when the phone box 600 is clicked may be configured in way that a different phone number may be associated with the phone box 600 at different times of the day, on different days of the week and based on the location of the end-user terminal 112*a*.

Figure 7E:
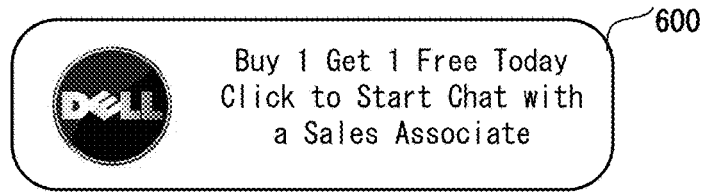

In yet another embodiment as depicted in FIG. 7E, a sponsor may wish replace a selected word in a document when displayed by the browser application 214. For example, Dell™ Corporation may wish to replace pre-selected words (e.g., occurrences of the word "Dell") by a pre-formatted graphics or information. The graphics or information may be selected from a database or a server based on a preset criteria. In one embodiment, date, time, location of the end-user terminal 112*a*, etc. may be considered for choosing the information to be displayed instead of a selected word. For example, if Dell is running a sales promotion or "daily deals", such information may be displayed instead of a selected word on a particular date or time. Further, the phone box 600 may be converted into a link to either call a particular phone number, as configured by the sponsor, or a link to start an online chat via an instant messaging application. In yet another embodiment, a sponsor may configure the system to replace a specific word by a link to chat or other Internet link. In yet another embodiment, a sponsor may wish to disable calling to a particular number at certain times, days or dates, etc.

Different color and font schemes may be used for displaying different types of calling options and phone boxes 600. In one embodiment, the user may configure the icons, color scheme, fonts, etc. for free, paid and sponsored calls. In another embodiment, the user may disable sponsored call options. The user may also disable formatting of the Web-pages to include the phone boxes 600.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

What is claimed is:

1. A method comprising:
   identifying, in an electronic document displayed on a computing device, a phone number for a relevant party, the phone number being displayed in a first display configuration and being usable to establish communication, via a packet-based communications system provider, between a user of the computing device and the relevant party;
   determining a sponsorship configuration of the phone number, the sponsorship configuration being provided by a third party sponsor distinct from the user, the relevant party, and the packet-based communications system provider;
   determining a caller account configuration associated with the user of the computing device;
   amending, via logic executed by the computing device, the electronic document to visually reformat the phone number according to the sponsorship configuration and the caller account configuration such that the visually reformatted phone number is displayed in the electronic document according to a second display configuration different than the first display configuration and is selectable to initiate a sponsored call to the relevant party;
   receiving an indication of a selection of the visually reformatted phone number from the electronic document; and
   causing, in response to said receiving the indication and via logic executed by the computing device, a sponsored call to be established with the relevant party such that data of the sponsored call is transmitted from the computing device at least partially over a packet-based network for receipt by a receiving device associated with the relevant party.

2. The method of claim 1, further comprising playing a selected advertisement according to the sponsorship configuration in response to the user initiating the sponsored call to the phone number from the electronic document.

3. The method of claim 1, wherein the sponsorship configuration includes formatting information of the phone number on a display of the device.

4. The method of claim 1, wherein the sponsorship configuration includes sponsorship conditions for the phone number.

5. The method of claim 1, wherein the sponsorship configuration includes a logo of the third party sponsor of a call to the phone number.

6. The method of claim 1, wherein the caller account configuration includes user's choice to make a sponsored call to the phone number.

7. The method of claim 1, further comprising, prior to allowing the sponsored call to be initiated, checking whether the phone number is included in an exception list as a phone number that is disallowed sponsored calls.

8. A non-transitory, hardware computer readable storage device storing a program which is executable to perform operations comprising:
   identifying a phone number displayed in an electronic document;
   determining a sponsorship configuration of the phone number;
   determining a caller account configuration, wherein the caller account configuration is associated with a user of a device and includes at least a number of available credits in the caller account;
   in an event that the caller account has a sufficient number of available credits to pay for a call to the phone number, amending the electronic document to visually reformat the phone number in the electronic document from a first display configuration to a second display configuration according to the sponsorship configuration and the caller account configuration, causing a first selectable control to be displayed that is selectable to initiate a call to the phone number as a sponsored call, and causing a second selectable control to be displayed that is selectable to initiate a call to the phone number using the available credits; and in an event that the caller account has an insufficient number of available credits to pay for a call to the phone number, amending the electronic document to visually reformat the phone number in the electronic document from the first display configuration to the second display configuration according to the sponsorship configuration and the caller account configuration, and
   causing the first selectable control to be displayed that is selectable to initiate a call to the phone number as a sponsored call;
   receiving an indication of a selection of one of the first selectable control or the second selectable control from the electronic document; and
   causing, in response to said receiving the indication of the selection and via logic executed by the device, a call representing one of a sponsored call or a call using the available credits to be established using the phone number such that data of the call is transmitted at least partially over a packet-based network for receipt by a different device associated with the phone number.

9. The non-transitory, hardware computer readable storage device of claim 8, wherein the operations further comprise playing a selected advertisement according to the sponsorship configuration in response to the user initiating a sponsored call to the phone number from the electronic document.

10. The non-transitory, hardware computer readable storage device of claim 9, wherein the operations further comprise, prior to initiating the sponsored call, checking whether the phone number is included in an exception list.

11. The non-transitory, hardware computer readable storage device of claim 8, wherein the sponsorship configuration includes formatting information of the phone number on a display of the device.

12. The non-transitory, hardware computer readable storage device of claim 8, wherein the sponsorship configuration includes at least one of sponsorship conditions for the phone number or a logo of a sponsor of a call to the phone number.

13. The non-transitory, hardware computer readable storage device of claim 8, wherein the caller account configuration includes the user's choice to make a sponsored call to the phone number.

14. A system comprising:
   one or more processors; and
   one or more computer-readable storage media storing computer-executable instructions that are executable by the one or more processors to cause the system to perform operations including:
   identifying a phone number included in an electronic document being displayable on a computing device;
   ascertaining a sponsorship configuration of the phone number and a caller account configuration for a user associated with the computing device;
   determining a current location of the computing device and relevance information based on the current location of the computing device, the relevance information including geographically relevant display characteristics of the phone number;
   responsive to said determining, amending the electronic document to visually reformat the phone number within the electronic document from a first display configuration to a second display configuration according to the sponsorship configuration, the caller account configuration, and the geographically relevant display characteristics of the phone number such that the visually reformatted phone number is displayed within the electronic document according to the second display configuration and is selectable to initiate a sponsored call to a party represented by the phone number;
   receiving an indication of a selection of the visually reformatted phone number from the electronic document; and
   causing, in response to said receiving the indication and via logic executed by the one or more processors, a sponsored call to be established with the phone number such that data of the sponsored call is transmitted from the computing device at least partially over a packet-based network for receipt by a receiving device associated with the phone number.

15. The system of claim 14, wherein the operations further include playing a selected advertisement according to the sponsorship configuration in response to a user initiation of the sponsored call to the phone number from the electronic document.

16. The system of claim 14, wherein the determining the current location of the device further comprises:
   using contextual information provided in the electronic document, and
   using related documents for determining the destination country of the phone call.

17. The system of claim 14, wherein the sponsorship configuration includes formatting information of the phone number on a display of the computing device.

18. The system of claim 14, wherein the sponsorship configuration includes a logo of a sponsor of a call to the phone number and specifies at least one pre-selected word for replacing with the logo of the sponsor of the call, the word appearing in the electronic document.

19. The system of claim 14, wherein the caller account configuration includes available caller account credits such that the user is permitted to choose to make a sponsored call to the phone number with an advertisement or to utilize the available caller account credits to make a nonsponsored call without an advertisement.

20. The system of claim 14, wherein the operations further include, prior to allowing a sponsored call to be initiated, checking that the phone number is not included in an exception list, that disallows one or more sponsored calls based on a phone number series.

* * * * *